US008108571B1

(12) United States Patent
Bouvier

(10) Patent No.: US 8,108,571 B1
(45) Date of Patent: *Jan. 31, 2012

(54) MULTITHREADED DMA CONTROLLER

(75) Inventor: Daniel L. Bouvier, Austin, TX (US)

(73) Assignee: Applied Micro Circuits Corporation, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/885,182

(22) Filed: Sep. 17, 2010

Related U.S. Application Data

(63) Continuation of application No. 11/974,729, filed on Oct. 16, 2007, now Pat. No. 7,822,885.

(51) Int. Cl.
G06F 13/28 (2006.01)
G06F 13/00 (2006.01)
G06F 13/14 (2006.01)
G06F 9/00 (2006.01)
G06F 9/44 (2006.01)
G06F 9/46 (2006.01)

(52) U.S. Cl. .......... 710/22; 710/5; 710/19; 710/23; 710/24; 710/33; 710/34; 710/35; 710/36; 710/39; 710/40; 710/42; 710/52; 710/305; 710/308; 710/310; 712/228; 712/229; 718/108

(58) Field of Classification Search ............ None
See application file for complete search history.

(56) References Cited

U.S. PATENT DOCUMENTS

| 6,092,127 | A * | 7/2000 | Tausheck | 710/56 |
| 6,178,462 | B1 * | 1/2001 | Bass et al. | 709/249 |
| 7,120,708 | B2 * | 10/2006 | Futral et al. | 710/26 |
| 7,424,556 | B1 * | 9/2008 | Spitzer et al. | 710/22 |
| 7,518,993 | B1 * | 4/2009 | Dennis | 370/235 |

* cited by examiner

Primary Examiner — Tanh Nguyen
(74) Attorney, Agent, or Firm — Law Office of Gerald Maliszewski; Gerald Maliszewski

(57) ABSTRACT

A channel-less system and method are provided for multithreaded communications with a direct memory access (DMA) controller. The method accepts a plurality of DMA command messages directed to a fixed port address. The DMA command messages are arranged in a first-in first-out (FIFO) queue, in the order in which they are received. The DMA command messages are supplied to a DMA controller from the FIFO queue, and in response to the DMA command message, data transfer operation are managed by the DMA controller. Following the completion of each data transfer operation, a transfer complete message indicating completion is sent. In one aspect, DMA command messages are arranged in a plurality of parallel FIFO queues, and CD sets are stored in a plurality of context memories, where each context memory is associated with a corresponding FIFO queue.

11 Claims, 5 Drawing Sheets

MULTITHREADED DMA CONTROLLER

RELATED APPLICATIONS

This application is a Continuation of an application entitled, CHANNEL LESSMULTITHREADED DMA CONTROLLER, invented by Daniel Bouvier, Ser. No. 11/974,729, filed Oct. 16, 2007, now U.S. Pat. No. 7,822,885 which is incorporated herein by reference.

BACKGROUND OF THE INVENTION

1. Field of the Invention

This invention generally relates to Direct Access Memory (DMA) processing and, more particularly, to a channel-less multithreaded DMA controller.

2. Description of the Related Art

A general purpose programmable DMA controller is a software-managed programmable peripheral block charged with moving or copying data from one memory address to another memory address. The DMA controller provides a more efficient mechanism to perform large data block transfers, as compared to a conventional general purpose microprocessor. The employment of DMA controllers frees up the processor and software to perform other operations in parallel. Instruction sequences for the DMA, often referred to as control descriptors (CDs), are set up by software and usually include a source address, destination address, and other relevant transaction information. A DMA controller may perform other functions such as data manipulations or calculations.

Control descriptors are often assembled in groups called descriptor sequences or rings. Typically, the software control of a DMA controller is enabled through a device specific driver. The device driver is responsible for low level handshaking between upper layer software and the hardware. This device driver manages the descriptor rings, communicates with the DMA controller when work is pending, and communicates with upper layer software when work is complete.

It is possible that a DMA controller may be shared by many concurrent software threads running on one or more processors. Conventionally, a DMA controller maintains the logical concept of "channels", whereby a channel provides the interface between a single software thread and the DMA controller. In other words, each software thread is associated with a channel. More concurrent driver threads require more DMA controller channels.

It has often been practice to provide multiple channels to address two concerns: thread sharing and quality of service. Oftentimes, multiple concurrent threads are used in systems for the parallel processing different aspects of data flow. Where multiple independent threads are deployed, sharing a common DMA controller can be cumbersome to manage. The software device driver in this case must not only provide the DMA controller with communications, but must also manage an arbitration scheme with upper layer software threads to determine which work gets done next. If this work is being carried out by multiple microprocessors, the overhead of coordination between threads is very complicated. The overhead coordination requires a certain level of software handshaking to determine which thread gets access to the controller at any particular time.

From a quality of service perspective, it is common to have higher and lower priority activities. For example, a software thread may queue a low priority transfer for a DMA controller. At some later time a different thread may be queued, which needs to run a higher priority task on the DMA controller. The ability to pre-empt low priority activities with higher priority tasks is a highly desired feature. Without such capability, a high priority operation must wait until a low priority operation is completed.

A multi-channel DMA controller addresses these issues where different software threads can be bound to specific channels and the underlying DMA controller hardware sorts out the access profile to memory based upon channel priorities. A disadvantage of the channel approach is that there are a limited number of hardware channels. If more logical threads exist than physical channels, then a software mechanism must once again be deployed to take care of the resource contention.

DMA controllers must also maintain a certain level of atomicity with respect to the execution of operations. This means that operational sequences must complete in the order programmed by software. This is typically accomplished using a run-to-completion model whereby a DMA channel completes all operations of a first CD, before moving onto the next CD. However, a brute-force run-to-completion methodology may prevent the data moving engine from performing un-related operations (operations from different CD lists) in parallel, even if the engine is capable.

The communication between software and the DMA controller hardware is typically handled through a programmed input/output (IO) interface. That is, the software device driver programs control registers within the DMA channel, which causes the DMA to carry out the desired action. When the DMA controller is finished it communicates back to software, either through use of a hardware interrupt request, or through setting of a status bit that is polled by software. The software must wait until the current instruction sequence is complete before programming the next sequence. During the software/hardware handshake period the DMA channel is idle waiting for the next CD, thus resulting in dead time that could have been used for real work. To overcome this dead time, DMA controllers may deploy the concept of control descriptor sequences (CDS) and descriptor rings.

The descriptor ring provides a form of FIFO where the software adds new items in memory for the DMA channel at the tail of the ring, while the DMA controller processes CDs from the head of the ring. In this way, the software manages the tail pointers and the hardware (HW) manages the head pointer. Such schemes have the disadvantage of requiring software overhead to keep track of pointers.

It would be advantageous if the programming model limitations of having fixed DMA channels as main linkage between software and hardware could be eliminated, while preserving thread independence, intra-thread atomicity, and a quality of service capability.

SUMMARY OF THE INVENTION

To address the deficiencies of a channel-based DMA controller while maintaining all of its advantages, a channel-less multithreaded DMA controller is presented. The channel-less DMA controller makes use of hardware-managed command queues for which control descriptors are submitted. The software sends command messages to a DMA command queue, where they are in turn executed in the received order by the DMA controller. At the completion of each task a completion message is generated and sent back to software to indicate task completion. The queuing mechanism permits multiple commands to be pipelined to the DMA controller from many software thread sources, while still maintaining the run-to-completion atomic behavior. The software entry point to the command queue is a fixed port address or mailbox. Because the command queue is a fixed location, there are no software pointers that must be maintained and, therefore, multiple software threads can enqueue messages to the port without any awareness of each other. To maintain completion order and thread-level atomicity, the DMA controller pulls command messages from the command queue and processes them in FIFO order run-to-completion.

Accordingly, a channel-less method is provided for multithreaded communications with a DMA controller. The method accepts a plurality of DMA command messages directed to a fixed port address. The DMA command messages are arranged in a FIFO queue, in the order in which they are received. The DMA command messages are supplied to a DMA controller from the FIFO queue, and in response to the DMA command message, data transfer operation are managed by the DMA controller. Following the completion of each data transfer operation, a transfer complete message indicating completion is sent.

Typically, the transfer complete message is sent to a software component. More explicitly, the DMA command messages may include a completion notification field with an embedded notification addresses. Then, the transfer complete message associated with a DMA command message is sent to the corresponding notification address.

In another aspect, DMA command messages are accessed from the FIFO queue. Sets of control descriptors (CDs) associated with (embedded in) the DMA command message are stored in a context memory, and a completion engine is loaded with sets of CDs from the context memory. In another aspect, DMA command messages are arranged in a plurality of parallel FIFO queues, and CD sets are stored in a plurality of context memories, where each context memory is associated with a corresponding FIFO queue.

Additional details of the above-described method and a channel-less system for multithreaded communications with a DMA controller are provided below.

DETAILED DESCRIPTION

Figure 1:
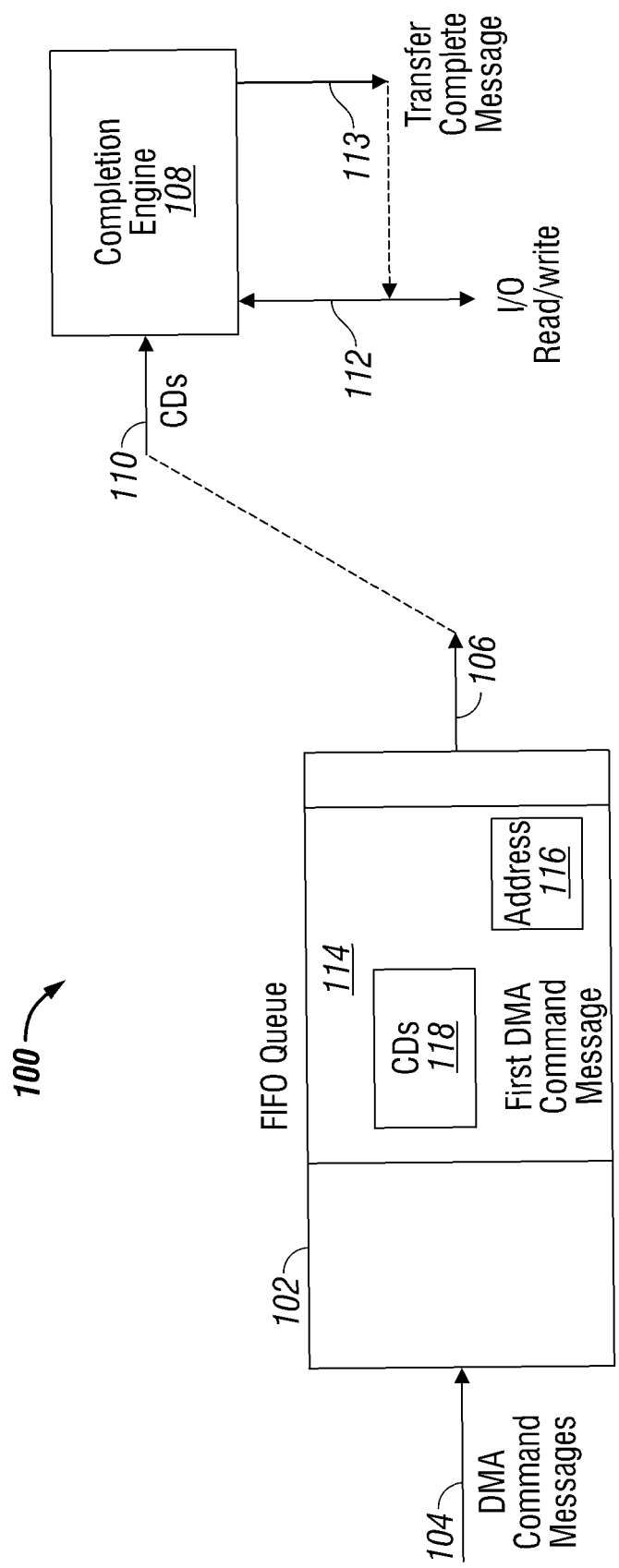
FIG. 1 is a schematic block diagram of a channel-less system for multithreaded communications with a direct memory access (DMA) controller.

Various embodiments are now described with reference to the drawings. In the following description, for purposes of explanation, numerous specific details are set forth in order to provide a thorough understanding of one or more aspects. It may be evident, however, that such embodiment(s) may be practiced without these specific details. In other instances, well-known structures and devices are shown in block diagram form in order to facilitate describing these embodiments.

As used in this application, the terms "processor", "processing device," "component," "module," "system," and the like are intended to refer to a computer-related entity, either hardware, firmware, a combination of hardware and software, software, or software in execution. For example, a component may be, but is not limited to being, a process running on a processor, generated component, a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets (e.g., data from one component interacting with another component in a local system, distributed system, and/or across a network such as the Internet with other systems by way of the signal).

Various embodiments will be presented in terms of systems that may include a number of components, modules, and the like. It is to be understood and appreciated that the various systems may include additional components, modules, etc. and/or may not include all of the components, modules etc. discussed in connection with the figures. A combination of these approaches may also be used.

The various illustrative logical blocks, modules, and circuits that have been described may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The methods or algorithms described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. A storage medium may be coupled to the processor such that the processor can read information from, and write information to, the storage medium. In the alternative, the storage medium may be integral to the processor. The processor and the storage medium may reside in an ASIC. The ASIC may reside in the node, or elsewhere. In the alternative, the processor and the storage medium may reside as discrete components in the node, or elsewhere in an access network.

FIG. 1 is a schematic block diagram of a channel-less system for multithreaded communications with a direct memory access (DMA) controller. The system 100 comprises a first-in first-out (FIFO) queue 102 having a fixed port address input on line 104 for accepting DMA command messages. The FIFO queue 102 arranges the DMA command messages in the order in which they are received and supplies DMA command messages at an output on line 106. A DMA completion engine 108 has an interface on line 110 to accept control descriptors (CDs) embedded in the DMA commands, and an input/output (IO) read/write interface on line 112 for managing data transfer operations. A transfer complete interface on line 113 is used for sending transfer complete messages, indicating the completion of the data transfer operations. The communications transceived via the above-mentioned IO read/write interface would the communications performed by any conventional DMA controller in managing the transfer of data in memory (not shown).

In one aspect, the FIFO queue 102 accepts a first DMA command message 114 with a completion notification field 116 having an embedded first notification address and first set of CDs 118. The completion engine 108, upon completion of a first data transfer operation associated with a first set of CDs, sends a first transfer complete message to the first notification address via the interface on line 113.

The DMA command messages contains a field with an address to which the completion engine sends the completion message upon completion of the data management tasks associated with the DMA command message. This field may be referred to as a completion address field or completion notification field. There is no such field in conventional DMA controllers using the descriptor ring approach. Rather, notification information resides in the descriptor ring itself, and is associated with one, and only one software thread. The difference in notification between the system of FIG. 1 and a conventional descriptor ring DMA controller system is that the system of FIG. 1 permits multiple threads to share the command FIFO. In fact, since there is no need to track the notification information, multiple processors can now share the same command FIFO. The convention ring equivalent would require a single channel DMA controller with multiple threads adding work to a single ring. However, the only way to add multiple threads to a single ring is to use a software semaphore scheme to arbitrate between threads, so that different threads can add CDs to the ring one at a time. This software semaphore scheme is inefficient, as it complex and requires much overhead.

The system of FIG. 1 "abstracts" the hardware from the software, so that there is no hard and fast limitation between how many threads share the DMA engine. Note: the system of FIG. 1 is especially advantageous for multi-processor systems. With many cores, providing N number of channels to match a potential of N threads, a conventional DMA controller would require a significant amount of hardware. This is because each channel requires a dedicated set of context hardware to keep track of the ring or descriptor chain. With respect to FIG. 1, an equivalent conventional descriptor ring/DMA controller scheme would require N transfer complete paths, representing N channels. However, the system of FIG. 1 can process an infinite number of channels (limited only by the number of address bits for the completion message address) using a single FIFO component and a DMA command message with a completion notification field.

Figure 2:
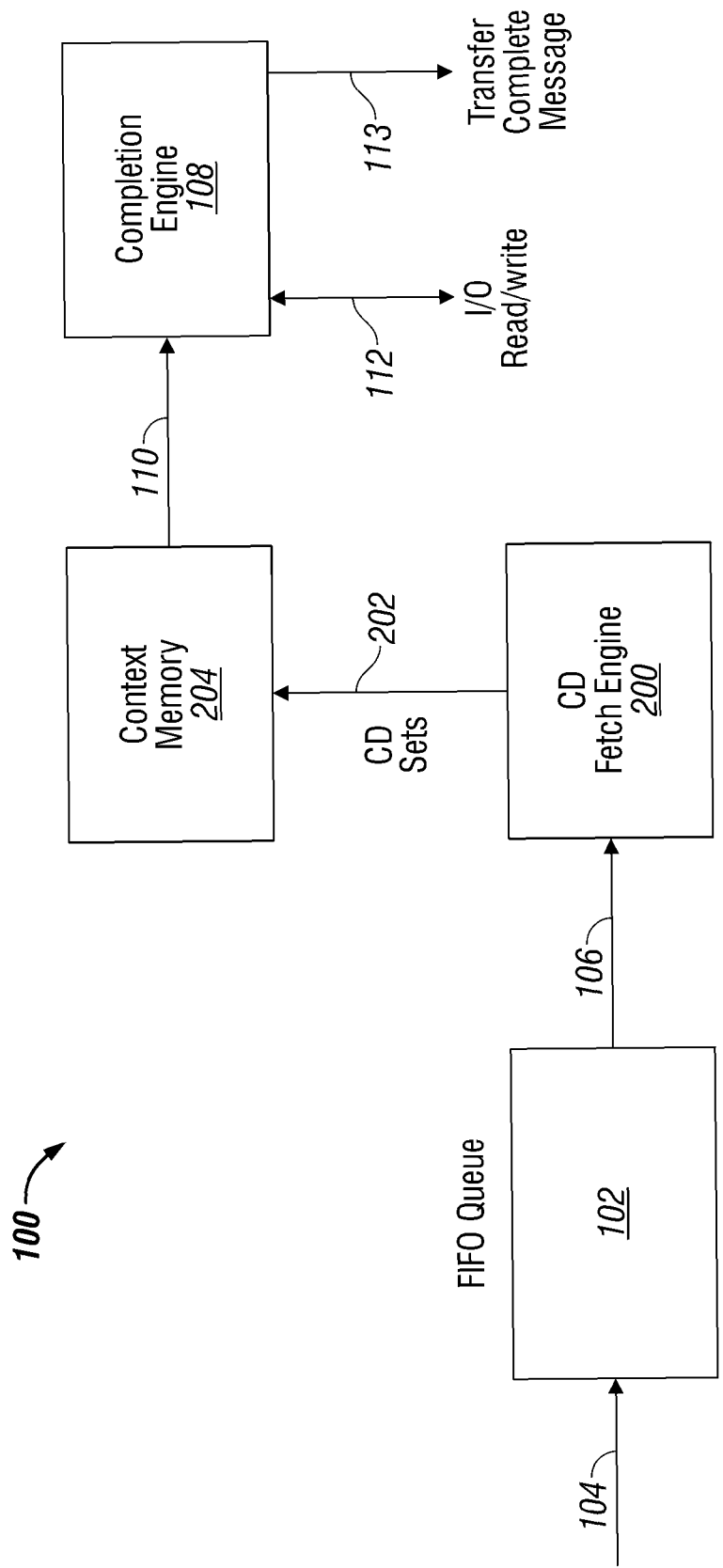
FIG. 2 is a schematic block diagram depicting a first variation in the system of FIG. 1.

FIG. 2 is a schematic block diagram depicting a first variation in the system of FIG. 1. A CD fetch engine 200 has an input for accepting DMA command messages from the FIFO queue 102 on line 106. The CD fetch engine 200 recovers CD sets from DMA command messages and supplies the CD sets at an output on line 202. A context memory 204 has an input to accept the CD sets on line 202. The context memory stores the CD sets and supplies the stored CDs to the completion engine 108 at an output on line 110.

It should be understood that a CD set may include one or more CDs. A CD set may include direct CDs or pointer CDs. A direct CD embodies the command descriptor completely within the command message. A pointer CD contains a pointer to a memory location where a single command descriptor, or a linked list of command descriptors, is located. In this case, a single command message may actually represent a number of chained command descriptors.

Figure 3:
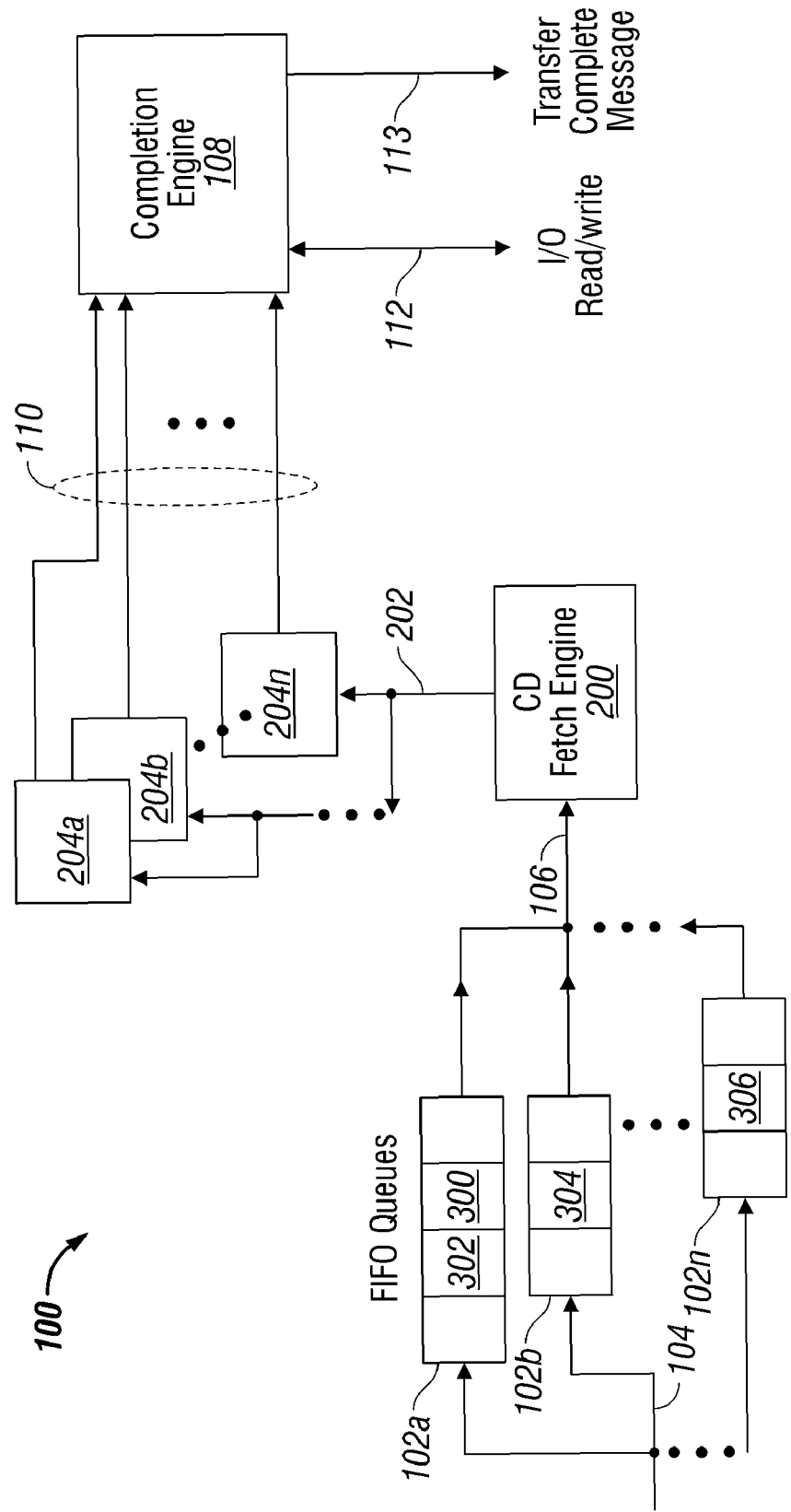
FIG. 3 is a schematic block diagram depicting a second variation of the system of FIG. 1.

FIG. 3 is a schematic block diagram depicting a second variation of the system of FIG. 1. In this aspect, a first plurality of parallel FIFO queues sharing the same fixed port address. The plurality of queues is represented as 102a through 102n, where n is not limited to any particular number. Also shown are a first plurality of context memories 204a through 204n, where each context memory is associated with a corresponding FIFO queue. Optionally, the first plurality of context memories 204a-204n may have a ranked order, with higher ranked context memories supplying CDs to the completion engine 108 at a higher message bandwidth than lower ranged context memories.

Because the DMA controller hardware is somewhat abstracted from the software, the controller can be scaled up or down without generally impacting the driver software. A larger more capable controller may have more parallel command queues while a smaller (lower cost) solution may have fewer. Since there is no hard channel binding between software and hardware, only the FIFO submit address needs to change. In a conventional hardware channel approach, each channel is hard-bound to the software driver. A reduction in the number of channels requires that the software be restructured.

In one aspect, FIFO queue 102a supplies a second DMA command message 302, subsequent to a first DMA command message 300, to context memory 204a. In accordance with the principle of atomicity, the completion engine 108 executes all CDs associated with the first DMA command message, prior to accepting CDs associated with the second DMA command message, from the first context memory 204a.

In another aspect, FIFO queue 102b supplies a third DMA command message 304 to context memory 204b, and FIFO queue 102n supplies a fourth DMA command message 306 to context memory 204n. In circumstances where atomicity is not required, the completion engine 108 executes CDs supplied from context memory 204n, prior to finishing the execution of CDs supplied from context memory 204b. Alternately, the completion engine 108 may execute CDs supplied from context memory 204b, prior to finishing the execution of CDs supplied from context memory 204n.

In another aspect of the system, context memories 204a-204n may store CD state information and the progress towards competition of the stored CDs, as explained in more detail below. Although the system is depicted as a network of connected hardware blocks, it should be understood that components of the system may be enabled using processor instructions stored in memory and executed by a processor device, or enabled as a logic-coded state machine. Although the system has been depicted as a combination of separate components, in some aspects some or all of the separate components may be embedded in a single chip, or embedded with components (not shown) from other systems.

Functional Description

The channel-less DMA controller makes use of hardware-managed command queues for which control descriptors are submitted. The software sends command messages to a DMA command FIFO queue, where they are in turn executed in the received order by the DMA controller. At the completion of each task a completion message is generated and sent back to software to indicate task completion. The FIFO queue permits multiple commands to be pipelined to the DMA controller from many software thread sources, while still maintaining the run-to-completion atomic behavior. The software entry point to the command queue is a fixed port address or mailbox. Because the command queue is a fixed location, there are no software pointers that must be maintained and, therefore, multiple software threads can enqueue messages to the port without any awareness of each other. To maintain completion order and thread level atomicity, the DMA controller pulls command messages from the command queue and processes them in FIFO order run-to-completion.

As a variation, multiple command queues may be employed to provide quality of service operations. Queues, or more particularly, the context memories being serviced by the queues, may be assigned different priority ranks. Commands that are posted to a higher priority queue are given preferential service by the DMA controller. This preferential service is typically done in the form of more transactional bandwidth allocation. To accomplish pre-emption, the DMA controller manages multiple thread contexts, thus keeping track of where each thread is at any point in time.

The DMA controller works in two operational modes: direct and chaining. In the direct mode, a software thread directly programs the DMA controller with the necessary transfer attributes, such as source and destination address, followed by a command to start the transfer. In the chaining or pointer mode, the software pre-loads into memory a list of transfers in the form of a command descriptor chain. This is followed by a command (pointer) to the DMA controller to begin execution with an address pointer to the start of the memory located chain.

One advantage of the channel-less DMA approach is the elimination of the conventional fixed-per-thread software-to-hardware binding for control and management of the DMA engine. Eliminated are the hardware constraints of not having enough "channels" to satisfy the number of unique software threads that would like to use the DMA engine. Also eliminated is the need for a centralized DMA software management thread through which other threads must communicate if not enough channels exist. Other advantages include the elimination of software overhead in managing a tail pointer or other mechanism for command enqueue to DMA controller. Software overhead is eliminated in managing quality of service (QoS), instead providing a hardware-managed QoS scheme while still maintaining per thread atomicity.

While the channel-less DMA approach may require additional hardware to contain and manage command queues for the DMA engine, this additional hardware is a small price to pay for the net gains in performance and flexibility to software. That is, the use of multiple command queues permits a quality of service scheme that can be implementing independent of software management, using the concept of higher priority and lower priority queues.

The DMA controller executes commands encoded by software into a command descriptor (CD). The CD describes the source and destination information for the transaction. In addition, the CD contains a command opcode and any other necessary attribute information to complete the transaction. CDs may be directly written to the DMA controller one at a time in the form of a command message. This is known as "direct mode". Another option is to place the CD in memory and to send the DMA controller a message with a pointer address to the CD. This is known as "pointer mode". In pointer mode, multiple CDs can be linked together to form a linked-list in memory for which the DMA controller will run in order to completion. This can be very useful for completing more complex linked operations.

The common usage model is for software to have pre-assembled message and CD templates in memory. The templates are then copied and modified with any unique parameters such as address pointers and then enqueued to one of the DMA message queues.

Figure 4:
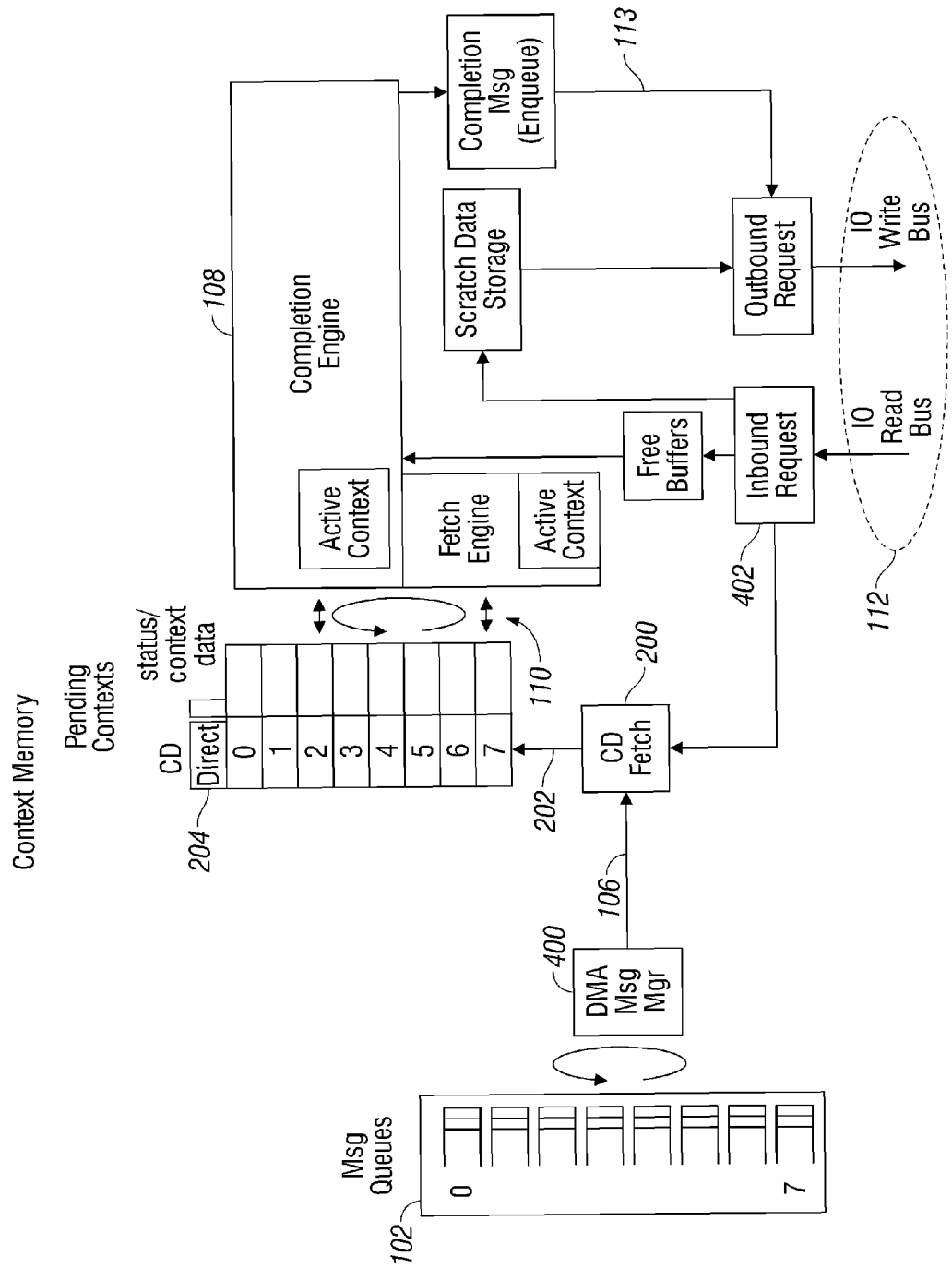
FIG. 4 is a schematic block diagram, depicting a third variation of the channel-less multithreaded DMA controller system.

FIG. 4 is a schematic block diagram, depicting a third variation of the channel-less multithreaded DMA controller system. The DMA module maintains any number of message queues. Eight such queues (102) are shown in the figure. A software thread can generate command messages to any one of the queues. Commands within each queue are serviced in FIFO order and run-to-completion. The FIFO ordering forms atomicity between each successive command message within the queue, permitting the software to enqueue multiple commands without concern for completion order. There is no completion order enforcement for commands enqueued to different message queues. If completion order is required, the software must either enqueue commands to the same queue or must wait until a completion message is received before enqueuing the next message to a different queue.

While the DMA controller is executing a CD it maintains information regarding the operation. This information is known as "CD context". A CD context may include the current byte count, address pointer, and next CD address pointer for linked-list operations.

For each of the eight message queues shown, the DMA controller maintains a pending CD context 204. This is the context information related to DMA operation that is currently in progress for that queue. In addition, the DMA module holds a prefetch CD context, which is the next CD operation that will be executed for the particular queue once the current operation is completed. Prefetching the CD context helps to pipeline operations to the DMA controller to minimize idle time.

The DMA controller can concurrently service commands from each command queue for up to eight simultaneous CDs in this example. This concurrency permits the servicing of higher priority operations without the need for waiting for lower priority operations to complete. The DMA controller initiates transactions for any of the current pending CD contexts. A weighted round robin scheme may be used, for example, to service the pending CD contexts, with each queue making at least one bus transaction before moving to the next queue. A transaction is defined as a single IO read bus transaction. Operations associated with higher priority queues are given more transactions on the IO read bus, thus completing sooner than operations associated with lower priority queues. A weighted round robin scheme guarantees that lower priority queues do not starve.

A processor generates command messages to one of the eight DMA message queues in this example. The DMA message queues are pre-programmed with a priority setting. The DMA Message Manager 400 extracts messages from the eight queues one at a time. If messages are pending in more than one queue a fairness scheme may be used to determine the order of queue extraction. The DMA message manager helps facilitate faster setup and servicing of messages from higher priority queues. Message entries (DMA command messages) within a queue are serviced by the DMA controller in FIFO order by the DMA message manager.

The extracted DMA message will either be a direct DMA command or a pointer DMA command. In the case of the direct DMA command, the message contains a CD. The CD includes the command opcode, source and destination information, and any other necessary information to complete the transaction. The information is directly loaded into the prefetch CD context store associated with the message queue. For pointer commands, the CD Fetch block 200 requests the CD context from the memory location pointed to by the address pointer in the message. The CD is fetched using the IO AXI read port 112 and then loaded into the prefetch CD context store 402. Upon completion of the current pending CD context the prefetched context is loaded into pending context store 204 and the controller can begin servicing the CD. If the CD is a linked list, the CD Fetch block 200 fetches the next CD into the prefetch CD context store. This is done until the last link in the chain is reached, at which point the CD Fetch block and extract another message from the associated queue.

There are eight pending and eight active CD context stores in this example, one for each message queue. For direct DMA commands, when the prefetched CD context moves to the pending CD context, the CD Fetch block extracts the next message from the associated queue.

Upon reception of data for a fetch, the data enters into the completion engine 108. In the simplest form, the completion engine merely writes the data to the destination address through the IO write bus 112 and increments the destination address for the next transaction. The completion engine might also perform some data manipulations as supported and requested.

The DMA controller can be thought of as a fine-grain multithreaded processor where each pending CD context is considered a thread. The DMA controller executes only one fetch and one completion transaction at a time. A transaction is defined as one IO bus operation. If multiple pending contexts are present, then the fetch engine services them one transaction at a time, based on the weighted round robin scheme for example. Pending contexts from higher priority queues have more transaction issue slots than lower priority queues. Since data may return from fetches out of order, the completion engine operates on the pending contexts in the order that data is received.

The system of FIG. 4 eliminates need for the hardware-based binding of channels to threads. The system eliminates software overhead of managing a tail pointer or other mechanism for command enqueuing to DMA controller. The system provides a hardware managed QoS scheme while still maintaining per thread atomicity, thus eliminating software overhead to manage such.

A performance advantage of this system over a conventional channel-based controller can be envisioned as a logical pipeline. In a channel-based approach the software driver must first submit work to the channel in the form of a command descriptor. Next, the channel carries out the command descriptor followed by notifying the software driver that it is done (either through interrupt or software polling). This handshaking can result in large bubbles of DMA idle time in-between when the engine completes the operation and the next command descriptor is loaded. To avoid this problem descriptor rings were created, whereby software adds new command descriptors to the tail of the ring while the engine processes them on the head of the ring. The problem with the descriptor ring approach is that software must constantly check the next entry in the ring to see if the tail has caught the ring. This handshaking can also be expensive in performance. In the channel-less system the hard link between software and channel is not required, such that the software can submit any number of command messages to the engine. The software is notified at some later time when the operations are complete.

Figure 5:
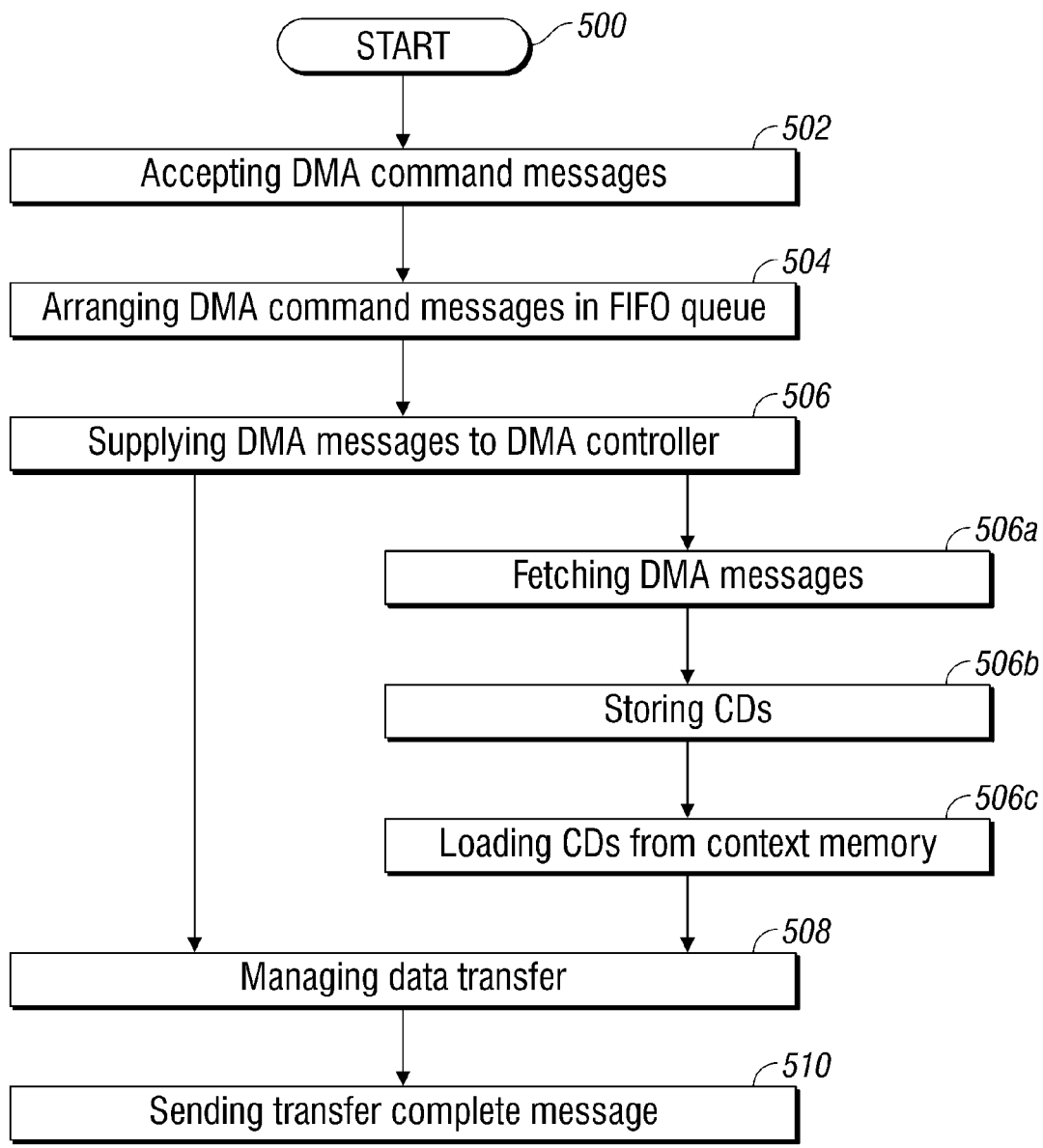
FIG. 5 is a flowchart illustrating a channel-less method for multithreaded communications with a DMA controller.

FIG. 5 is a flowchart illustrating a channel-less method for multithreaded communications with a DMA controller. Although the method is depicted as a sequence of numbered steps for clarity, the numbering does not necessarily dictate the order of the steps. It should be understood that some of these steps may be skipped, performed in parallel, or performed without the requirement of maintaining a strict order of sequence. The method starts at Step 500.

Step 502 accepts a plurality of DMA command messages directed to a fixed port address. Step 504 arranges the DMA command messages in a FIFO queue, in the order in which they are received. Step 506 supplies a first DMA command message to a DMA controller from the FIFO queue. In response to the first DMA command message, Step 508 manages a first data transfer operation. Step 510 sends a first transfer complete message indicating completion of the first data transfer operation.

In one aspect, supplying the first DMA command message to the DMA controller in Step 506 includes supplying a first DMA command message with a completion notification field having an embedded first notification address. Then, sending the first transfer complete message in Step 510 includes sending the first transfer complete message to the first notification address.

In another aspect, supplying the first DMA command message to the DMA controller (Step 506) includes substeps. Step 506a fetches the first DMA command message from the FIFO queue. Step 506b stores a first set of control descriptors (CDs) associated with the first DMA command message in a context memory. The CD set may include direct CDs and pointer CDs. Further, Step 506b may store CD state information and the progress towards competition of the stored CDs. Step 560c loads a completion engine with the first set of CDs from the context memory.

In one variation, arranging the DMA command messages in the FIFO queue in Step 504 includes arranging the DMA command messages in a first plurality of parallel FIFO queues. Then, storing the first set of CDs associated with the first DMA command message in a context memory (Step 506b) includes storing a plurality of CD sets in a first plurality of context memories, where each context memory is associated with a corresponding FIFO queue. Further, the first plurality of context memories may be ranked, and loading the completion engine from the context memory (Step 506c) may include providing a higher message bandwidth to context memories having a higher ranking.

In another variation, Step 506 supplies a second DMA command message, subsequent to the first DMA command message, to a first FIFO queue. Then, managing the first data transfer operation in response to the first DMA command message (Step 508) includes executing all CDs associated with the first DMA command message, prior to executing CDs associated with the second DMA command message.

In another aspect, Step 506 supplies the first DMA command message from a second FIFO queue, and a third DMA command message is supplied from a third FIFO queue. Then, Step 508 executes CDs associated with the third DMA command message, prior to finishing the execution of CDs associated with the first DMA command message.

A channel-less multithreaded DMA controller has been presented. Examples of particular components and process steps have been given to illustrate the invention. However, the invention is not limited to merely these examples. Other variations and embodiments of the invention will occur to those skilled in the art.

I claim:

1. A method for multithreaded communications with a direct memory access (DMA) controller, the method comprising:

accepting a plurality of DMA command messages directed to a fixed port address, the plurality of DMA command messages comprising a first DMA command message and a second DMA command message, each DMA command message including a completion notification field, with a notification address embedded in the completion notification field, and a set of control descriptors (CDs), where the CDs are instruction sequences to be performed by a DMA completion engine;

arranging the plurality of DMA command messages in a non-virtual first-in first-out (FIFO) queue, implemented as a fixed number plurality of parallel non-virtual FIFO sub-queues, each non-virtual FIFO sub-queue loading corresponding DMA command messages in an order in which they are received;

storing a plurality of CD sets in a plurality of context memories, the plurality of CD sets comprising a first CD set and a second CD set, where each CD set is associated with a corresponding DMA command message, where each context memory is associated with a corresponding one of the fixed number plurality of parallel non-virtual FIFO sub-queues;

fetching the first DMA command message from a first non-virtual FIFO sub-queue;

storing the first set of CDs associated with the first DMA command message in a first context memory;

fetching the second DMA command message from a second non-virtual FIFO sub-queue;

storing the second set of CDs associated with the second DMA command message in a second context memory;

loading a completion engine with the first and second CD sets, respectively from the first and the second context memories to initiate transactions with the first set of CDs and the second set of CDs;

completing transactions with the second set of CDs prior to finishing transactions with the first set of CDs by the completion engine; and, sending a transfer complete message to the notification address embedded in the second DMA command message, indicating completion of a data transfer operation associated with the second set of CDs by the completion engine.

2. The method of claim 1 wherein storing the plurality of CD sets includes storing CDs selected from a group consisting of direct CDs and pointer CDs.

3. The method of claim 1 wherein the second context memory has a priority ranking with a higher priority than the first context memory priority ranking; and, wherein completing transactions with the second set of CDs prior to finishing transactions with the first set of CDs by the completion engine includes giving preferential treatment to CDs sourced from the second context memory, with respect to CDs sourced from the first context memory.

4. The method of claim 3 wherein completing transactions with the second set of CDs prior to finishing transactions with the first set of CDs by the completion engine includes the DMA completion engine giving preferential data transfer treatment to the second set of CDs sourced from the second context memory, associated with the second non-virtual FIFO sub-queue, over the data transfer treatment given to the first set of CDs sourced from the first context memory, associated with the first non-virtual FIFO sub-queue.

5. The method of claim 1 wherein storing the first set of CDs in the first context memory includes:

storing CD state information for the first set of CDs; and,
tracking the progress towards completing the storage of each CD in the first set of CDs.

6. A system for multithreaded communications with a direct memory access (DMA) controller, the system comprising:

a non-virtual first-in first-out (FIFO) queue, implemented as a fixed number plurality of parallel non-virtual FIFO sub-queues, the non-virtual FIFO queue having a fixed port address input configured to accept DMA command messages, each DMA message including a completion notification field having an embedded notification address and a set of control descriptors (CDs), where the CDs are instructions to be performed by a completion engine, each non-virtual FIFO sub-queue loading corresponding DMA command messages in an order in which they are received and supplying the corresponding DMA command messages at its output;

a CD fetch engine having an input configured to accept the DMA command messages from the fixed number plurality of parallel non-virtual FIFO sub-queues, the DMA command messages comprising a first DMA command message and a second DMA command message, the CD fetch engine recovering CD sets associated with the DMA command messages and supplying the CD sets at an output of the CD fetch engine, the CD sets comprising a first CD set and a second CD set;

a memory implemented as a fixed number plurality of context memories, each context memory having an input to accept corresponding CD sets, each context memory storing the corresponding CD sets and supplying the stored corresponding CDs to the completion engine at its output, the fixed number plurality of context memories comprising a first context memory and a second context memory; and, the completion engine having an interface to accept CDs included in the DMA command messages, the completion engine initiating transactions with the first set of CDs from the first context memory and initiating transactions with the second set of CDs from the second context memory, and finishing transactions with the second set of CDs prior to finishing transactions with the first set of CDs, the completion engine having an input/output (IO) read/write interface configured to manage data transfer operations, and a transfer complete interface configured to send transfer complete messages to notification addresses embedded in the completion notification fields, indicating the completion of associated data transfer operations.

7. The system of claim 6 wherein each context memory stores CD sets comprising CDs selected from a group consisting of direct CDs and pointer CDs.

8. The system of claim 6 wherein each context memory is associated with a corresponding one of the fixed number plurality of parallel non-virtual FIFO sub-queues.

9. The system of claim 8 wherein the plurality of context memories have a ranked order, with higher ranked context memories supplying CDs to the completion engine at a higher message bandwidth than lower ranked context memories.

10. The system of claim 9 wherein the completion engine executes CDs supplied from the second context memory, the second context memory being associated with a second non-virtual FIFO sub-queue from the fixed number plurality of non-virtual FIFO sub-queues, prior to finishing the execution of CDs supplied from the first context memory, the first context memory being associated with a first non-virtual FIFO sub-queue from the fixed number plurality of non-virtual FIFO sub-queues.

11. The system of claim 6 wherein the context memories store CD state information in the CD sets and track progress towards the completion of storing each CD in the CD sets.

* * * * *